US 12,522,146 B2

(12) United States Patent
Stephan (10) Patent No.: US 12,522,146 B2
(45) Date of Patent: Jan. 13, 2026

(54) CENTER CONSOLE FOR A VEHICLE

(71) Applicant: Ford Global Technologies, LLC, Dearborn, MI (US)

(72) Inventor: Joerg Stephan, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 346 days.

(21) Appl. No.: 18/239,451

(22) Filed: Aug. 29, 2023

(65) Prior Publication Data

US 2024/0101034 A1    Mar. 28, 2024

(30) Foreign Application Priority Data

Sep. 28, 2022 (DE) .......................... 102022124899.2

(51) Int. Cl.
*B60R 7/04* (2006.01)
*B60R 11/02* (2006.01)
*B60R 11/00* (2006.01)

(52) U.S. Cl.
CPC ............ *B60R 7/04* (2013.01); *B60R 11/0229* (2013.01); *B60R 2011/0007* (2013.01)

(58) Field of Classification Search
CPC ........................ B60R 7/04; B60R 2011/0007
USPC ............................................. 296/24.34, 37.8
See application file for complete search history.

(56) References Cited

U.S. PATENT DOCUMENTS

| 7,104,580 | B2 | 9/2006 | Clark et al. | |
| 8,454,071 | B2* | 6/2013 | Stoia ...................... | B60N 2/773 |
| | | | | 296/1.09 |
| 8,540,297 | B2* | 9/2013 | Browne ................ | B60N 2/773 |
| | | | | 296/37.8 |
| 8,714,617 | B2* | 5/2014 | Hipshier .................. | B60R 7/04 |
| | | | | 296/37.8 |
| 10,709,249 | B2 | 7/2020 | Liu et al. | |
| 2003/0197392 | A1 | 10/2003 | Clark et al. | |
| 2003/0234550 | A1 | 12/2003 | Brooks et al. | |
| 2010/0314896 | A1 | 12/2010 | Skibinski et al. | |
| 2012/0319440 | A1* | 12/2012 | Andersson ............ | B60N 3/102 |
| | | | | 297/188.17 |
| 2015/0115641 | A1 | 4/2015 | Inoue et al. | |

FOREIGN PATENT DOCUMENTS

| CN | 213705335 U | 7/2021 |
| DE | 102009055834 A1 | 6/2011 |
| DE | 10321837 B4 | 3/2014 |
| JP | 9267662 A | 10/1997 |

\* cited by examiner

*Primary Examiner* — Dennis H Pedder
(74) *Attorney, Agent, or Firm* — Vichit Chea; Price Heneveld LLP (57) ABSTRACT

A center console for a vehicle, having at least one rearwardly situated armrest and having at least one functional unit. In order to enable an existing structural space to be utilized optimally, and at the same time optimize the center console with regard to its storage space, the functional unit is mounted to be linearly movable between a rearward rest position, in which the functional unit is arranged at least predominantly under the armrest, and at least one forward functional position, in which the functional unit is at least predominantly forwardly offset in relation to the armrest.

16 Claims, 4 Drawing Sheets

CENTER CONSOLE FOR A VEHICLE

CROSS-REFERENCE TO RELATED APPLICATION

This application claims foreign priority benefits under 35 U.S.C. § 119(a)-(d) to German Application No. 102022124899.2 filed Sep. 28, 2022, which is hereby incorporated by reference in its entirety.

FIELD OF THE DISCLOSURE

The present disclosure generally relates to a center console for a vehicle, and more particularly relates to a center console having at least one rearwardly situated armrest and having at least one functional unit.

BACKGROUND OF THE DISCLOSURE

A typical center console for a vehicle normally extends rearwardly from a knee region between two front footwells as far as between two front seats. Center consoles can be of very different designs, and normally have at least one functional unit, for example one or more beverage holders.

It would be desirable to provide a center console which has an available structural space that can be optimally utilized, and which is at the same time optimized with regard to its storage space.

SUMMARY OF THE DISCLOSURE

According to a first aspect of the present disclosure, a center console comprises a rearwardly situated armrest and is mounted to be linearly movable between a rearward rest position, in which the functional unit is arranged at least predominantly under the armrest, and at least one forward functional position, in which the functional unit is at least predominantly forwardly offset in relation to the armrest.

Embodiments of the first aspect of the present disclosure can include any one or a combination of the following features:

The center console has a functional unit, which has at least one beverage holder, an induction charging unit, and a stowage compartment.

The center console comprises a storage trough which extends rearwardly to be situated partially under the armrest and within which the functional unit is linearly movable mounted.

The center console comprises a roller shutter for closing an upper entrance opening of the storage trough.

The center console comprises a storage chamber arranged under the armrest, wherein the armrest is pivotable about a horizontal axis.

The center console comprises a display-holding unit which is forwardly spaced from the armrest.

The center console, wherein on the display-holding unit, there are formed at least one display holder and at least one upwardly open stowage compartment which is arranged forward of the display holder.

The center console, wherein on the display-holding unit, a further functional unit is mounted to be linearly movable between a forward rest position, in which the further functional unit is at least predominantly concealed on the display-holding unit, and a rearward functional position, in which the further functional unit is at least predominantly rearwardly offset in relation to the display-holding unit.

The center console has a further functional unit which is of a portal-like form and is mounted to be linearly movable between a forward rest position and a rearward functional position, wherein a spacing between the further functional unit and the armrest is smaller when the further functional unit is in the functional position than when the further functional unit is in the rest position.

The center console comprises at least one rail guide arranged forward of the armrest and by use of which the further functional unit is linearly movable mounted.

According to a second aspect of the present disclosure, a console comprises a rearwardly situated armrest and a functional unit mounted to be linearly movable between a rearward rest position, in which the functional unit is arranged at least predominantly under the armrest, and at least one forward functional position, in which the functional unit is at least predominantly forwardly offset in relation to the armrest, where the functional unit has at least one of a beverage holder, an induction charging unit, and a stowage compartment. The console comprises a storage trough which extends rearwardly to be situated partially under the armrest and within which the functional unit is linearly movable mounted.

Embodiments of the second aspect of the present disclosure can include any one or a combination of the following features:

The console has a roller shutter for closing an upper entrance opening of the storage trough;

The console comprises a storage chamber arranged under the armrest, wherein the armrest is pivotable about a horizontal axis;

The center console comprises a display-holding unit which is forwardly spaced from the armrest;

The console has a display-holding unit, in which there are formed at least one display holder and at least one upwardly open stowage compartment which is arranged forward of the display holder;

The console has a display-holding unit, wherein a further functional unit is mounted to be linearly movable between a forward rest position, in which the further functional unit is at least predominantly concealed on the display-holding unit, and a rearward functional position, in which the further functional unit is at least predominantly rearwardly offset in relation to the display-holding unit;

The console has a further functional unit which is of a portal-like form and is mounted to be linearly moveable between a forward rest position and has a rearward functional position, wherein the spacing between the further functional unit and the armrest is smaller when the further functional unit is in the functional position than when the further functional unit is in the rest position;

The console comprises at least one rail guide and is arranged forward of the armrest by use of which the further functional unit is linearly movable mounted; and The console is a center console.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

In the various figures, identical parts are always denoted by the same reference designations, for which reason the parts will generally also be described only once.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 1A:
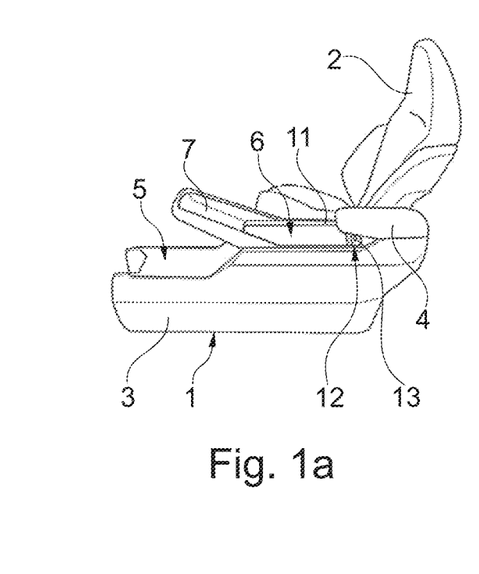
FIG. 1a is a schematic and perspective illustration of an exemplary embodiment of a center console in a first state.
Figure 1B:
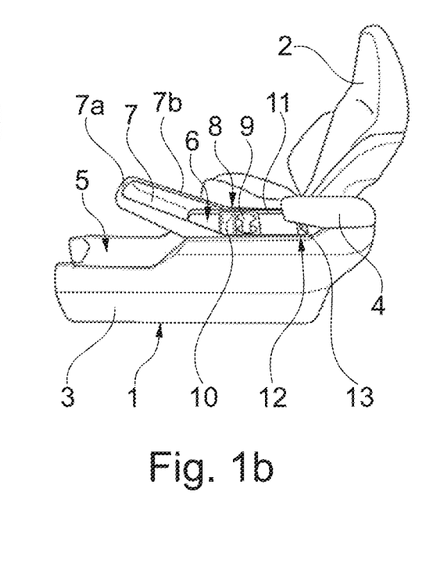
FIG. 1B is a schematic and perspective illustration of an exemplary embodiment of a center console in a second state.
Figure 1C:
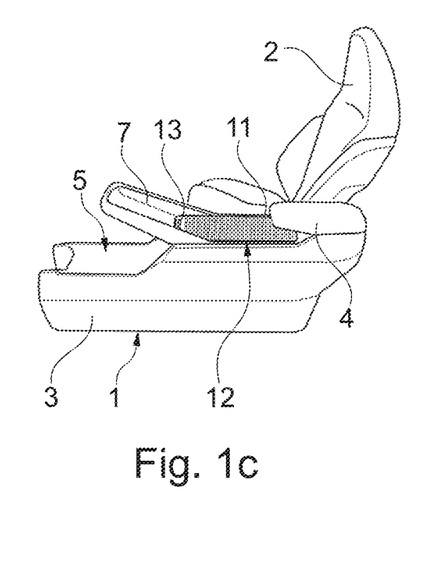
FIG. 1c is a schematic and perspective illustration of an exemplary embodiment of a center console in a third state.

For purposes of description herein, the terms "upper," "lower," "right," "left," "rear," "front," "vertical," "horizontal," and derivatives thereof shall relate to the concepts as oriented in FIGS. 1a-1c. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a center console for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

FIGS. 1a-1c are schematic and perspective illustrations of an exemplary embodiment of a center console 1 illustrated in different states. A first front seat 2 is shown on one lateral side adjacent to the center console 1. FIGS. 1a-1c do not show a further second front seat, wherein the center console 1 is arranged between the two front seats.

The center console 1 has a main body 3 and has an armrest 4 in a rearward position on the main body 3. The armrest 4 is immovably connected to the main body 3. The main body 3 has a forward stowage compartment 5.

The center console 1 furthermore has a storage trough 6 shown in FIGS. 1a and 1b, which extends rearwardly so as to be situated partially under the armrest 4 and which is formed within an elevated rearward portion of the main body 3. The center console 1 furthermore has a shelf unit 7 which is fastened to the forward end of the elevated portion of the main body 3 and extends in an inclined manner. Here, the shelf unit 7 is oriented so as to extend obliquely upward from the rearward end in the direction of the forward end, as shown by way of example. The shelf unit 7 has an upwardly oriented free end 7a and is of approximately trough-like form. In the opening position illustrated, the shelf unit 7 opens up the storage trough 6. In one refinement, the shelf unit 7 may be mounted pivotably on the center console 1 such that the shelf unit 7 is pivoted with its free end 7a in the direction of the armrest 4 and, in a closure position, closes the storage trough 6 to cover the latter. Since the shelf unit 7 is of trough-like form, the shelf unit 7 lies, when in the closed position, with the projecting side flanges 7b against edges of the storage trough 6. Valuable articles can be securely stored if the shelf unit 7 can be locked in in its closure position. Furthermore, in addition to the possible support afforded by the existing armrest 4, a further stable shelf is formed on which vehicle occupants could support themselves.

The center console 1 furthermore has a functional unit 8 shown in FIG. 1b. The functional unit 8 is mounted linearly movable between a rearward rest position, in which the functional unit 8 is concealed under the armrest 4 and thus fully opens up an entrance opening 11 of the storage trough 6, as indicated in FIG. 1a, and at least one forward functional position shown in FIG. 1b, in which the functional unit 8 is forwardly offset in relation to the armrest 4. In particular, the functional unit 8 is mounted linearly movably within the storage trough 6. The functional unit 8 has, for example, two laterally mutually spaced beverage holders 9 and a stowage compartment 10 that is arranged forward of the beverage holders 9.

The center console 1 furthermore has a roller shutter 12 for closing the upper entrance opening 11 of the storage trough 6. The roller shutter 12 has horizontal slats hinged together and may be configured as a tambour door, for example. FIGS. 1a and 1b show the roller shutter 12 in an open position in which it substantially opens up the entrance opening 11 of the storage trough 6 but projects into the entrance opening 11 to a small extent by way of an actuating portion 13 in order that it can be gripped by hand. FIG. 1c shows the roller shutter 12 in its closed position in which the roller shutter 12 completely closes the entrance opening 11 of the storage trough 6. The shelf unit 7 therefore does not imperatively need to be pivoted into its closure position if the roller shutter 12 is present. It is possible for the shelf unit 7 to be operatively connected to the roller shutter 12 such that a pivoting movement of the shelf unit 7 into its closure position simultaneously causes the roller shutter 12 to close. Conversely, a pivoting movement of the shelf unit 7 out of its closure position can cause the roller shutter 12 to open. The roller shutter 12 can however also be actuated independently of the shelf unit 7, such that the roller shutter 12 can be opened or closed without actuating the shelf unit 7.

Figure 2A:
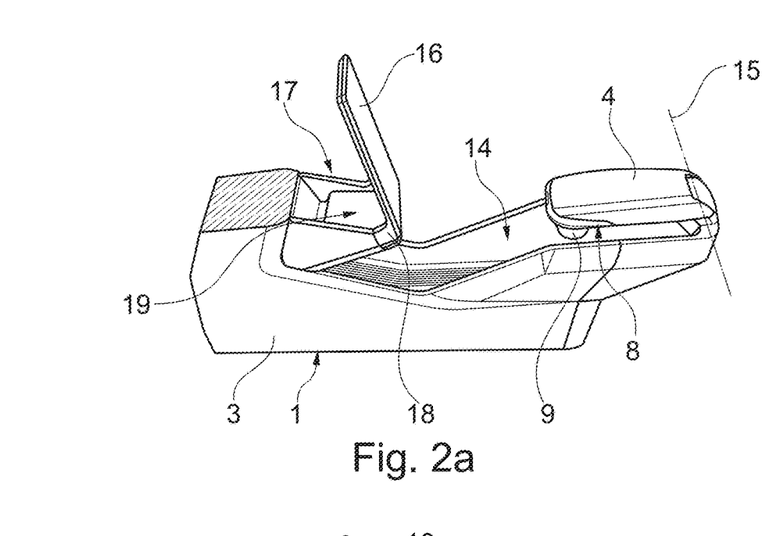
FIG. 2a is a schematic and perspective illustration of a further exemplary embodiment of a center console in a first state.
Figure 2B:
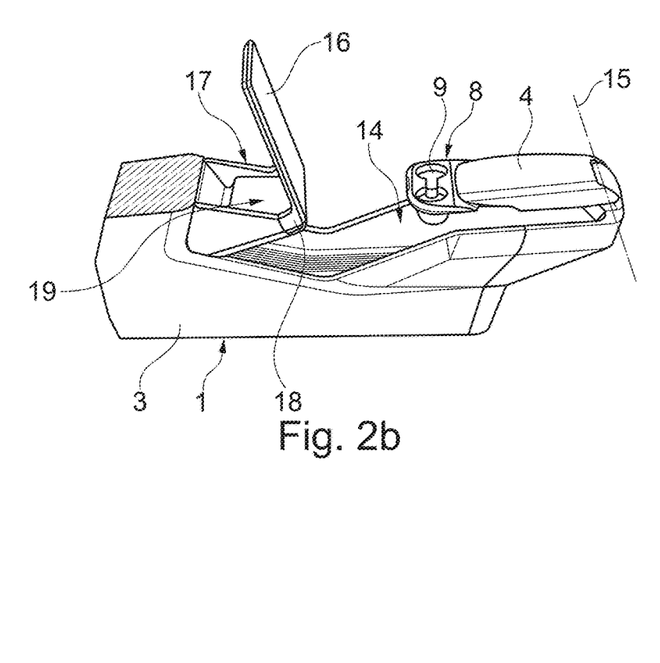
FIG. 2b is a schematic and perspective illustration of an exemplary embodiment of a center console in a second state.
Figure 2C:
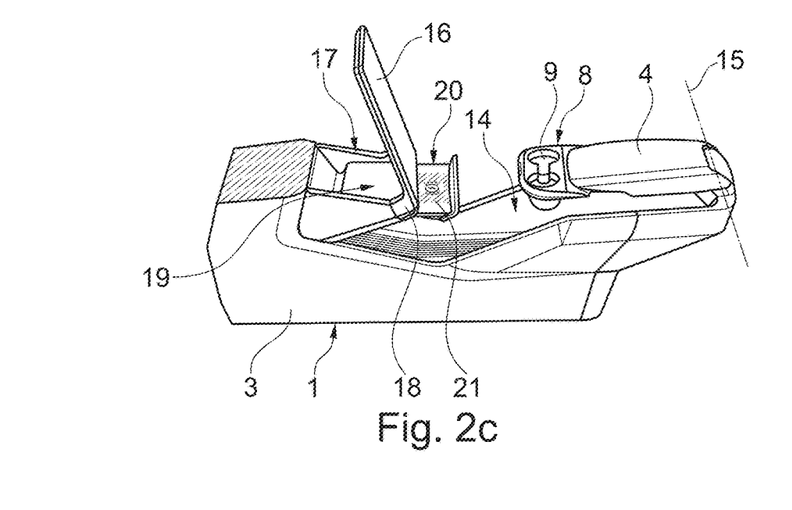
FIG. 2c is a schematic and perspective illustration of an exemplary embodiment of a center console in a third state.

FIGS. 2a-2c are schematic and perspective illustrations of a further exemplary embodiment of a center console 1 illustrated in different states. The center console 1 has the main body 3 and has the armrest 4 in a rearward position on the main body 3. The main body 3 has a continuous, upwardly open storage chamber 14 that extends as far as under the armrest 4. The armrest 4 is pivotable about a horizontal axis 15.

The center console 1 furthermore has the functional unit 8. The functional unit 8 is mounted linearly movable between a rearward rest position shown in FIG. 2a, in which the functional unit 8 is predominantly concealed under the armrest 4 and thus fully opens up an entrance to the storage chamber 14, and a forward functional position shown in FIGS. 1b and 1c, in which the functional unit 8 is forwardly offset in relation to the armrest 4. In particular, the functional unit 8 is mounted to move linearly on the armrest 4. The functional unit 8 has, for example, two laterally mutually spaced beverage holders 9.

The center console 1 furthermore has a display-holding unit 17 which supports a display, for example a touchscreen 16, and which is forwardly spaced from the armrest 4. On the display-holding unit 17, there are formed a display holder 18 and an upwardly open stowage compartment 19 which is arranged forward of the display holder 18.

In one embodiment, the display unit 17 may be pivotable such that the display held thereon can be pivoted in the direction of the stowage compartment 19 so as to cover the stowage compartment 19. In the opening position of the stowage compartment 19, as illustrated in FIG. 2a-2c, the stowage compartment is easily accessible. The display unit 17 or the display held thereon can however be pivoted further in the direction of the armrest 4 than is illustrated in FIG. 2a-2c, in order to thus allow the stowage compartment 19 to be opened up further. In an ideal refinement, the display unit 17 or the display arranged thereon is pivotable in a continuously variable fashion. This may be expedient for example in the case of changing light incidence or reflections in order that the images and information being output on the display can thus be kept visible at all times.

On the display-holding unit 17, a further functional unit 20 is mounted linearly movably between a forward rest position indicated in FIGS. 2a and 2b, in which the further functional unit 20 is predominantly concealed on or within the display-holding unit 17, and a rearward functional position shown in FIG. 2c, in which the further functional unit 20 is predominantly rearwardly offset in relation to the display-holding unit 17. The further functional unit 20 has an induction charging unit 21 for inductively charging one or more electrically powered devices, according to one example.

Figure 3A:
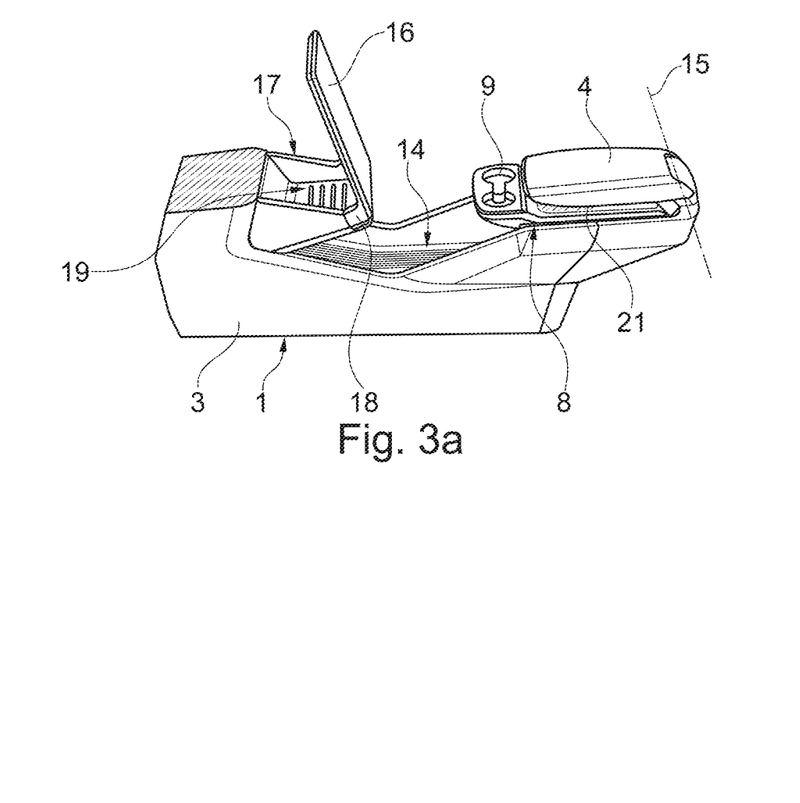
FIG. 3a is a schematic and perspective illustration of a further exemplary embodiment of a center console in a first state.
Figure 3B:
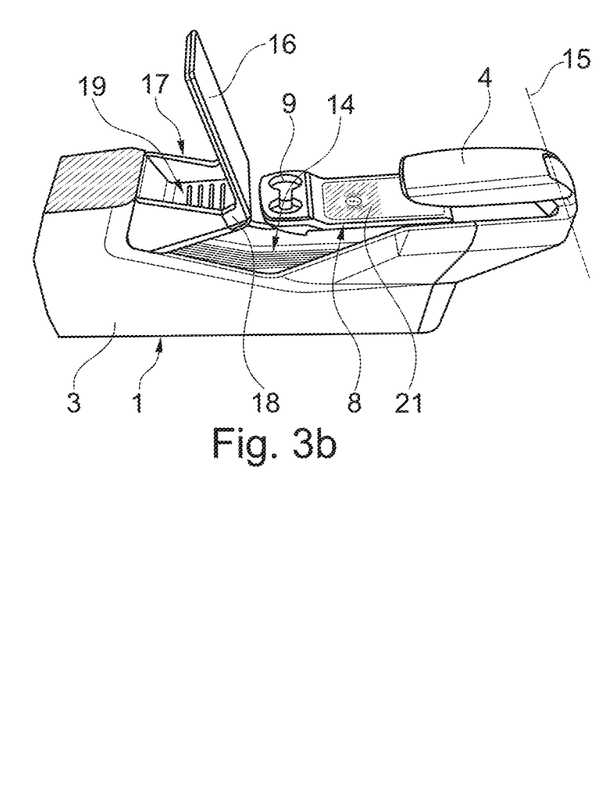
FIG. 3b is a schematic and perspective illustration of an exemplary embodiment of a center console in a second state.

FIGS. 3a and 3b are schematic and perspective illustrations of a further exemplary embodiment of a center console 1 in different states.

The center console 1 has the main body 3 and has the armrest 4 in a rearward position on the main body 3. The main body 3 has the continuous, upwardly open storage chamber 14 that extends as far as under the armrest 4. The armrest 4 is pivotable about the horizontal axis 15.

The center console 1 furthermore has the functional unit 8. The functional unit 8 is mounted linearly movable between a rearward rest position shown in FIG. 3a, in which the functional unit 8 is predominantly concealed under the armrest 4 and thus fully opens up an entrance to the storage chamber 14, and a forward functional position shown in FIG. 3b, in which the functional unit 8 is predominantly forwardly offset in relation to the armrest 4. In particular, the functional unit 8 is mounted to move on the main body 3. On the example shown, the functional unit 8 has two laterally mutually spaced beverage holders 9 and an induction charging unit 21 that is arranged rearward thereof. A portion of the functional unit 8 that has the beverage holders 9 is forwardly spaced from the armrest 4 in all positions of the functional unit 8 and can be gripped by a hand of a user for the purposes of moving the functional unit 8.

The center console 1 furthermore has the display-holding unit 17 which supports the display, for example the touchscreen 16, and which is forwardly spaced from the armrest 4. Formed on the display-holding unit 17 are the display holder 18 and an upwardly open stowage compartment 19 which is arranged forward of the display holder 18. In this regard, reference is also made to the exemplary embodiment of FIGS. 2a-2c, the design of which can be implemented. In the exemplary embodiment of FIGS. 3a-3b, the beverage holder 9 and induction charging unit 21 are accordingly arranged on the functional unit 8, wherein the beverage holder 9, which is accessible practically at all times, is arranged forward of the induction charging unit 21. In the embodiment according to FIGS. 2a-2c, the beverage holder 9 is arranged at the armrest, while the induction charging unit 21 is arranged at the display. It is conceivable in the refinement according to FIGS. 2a-2c for the beverage holder 9 to be arranged at the display, wherein the induction charging unit 21 could be arranged at the armrest.

Figure 4A:
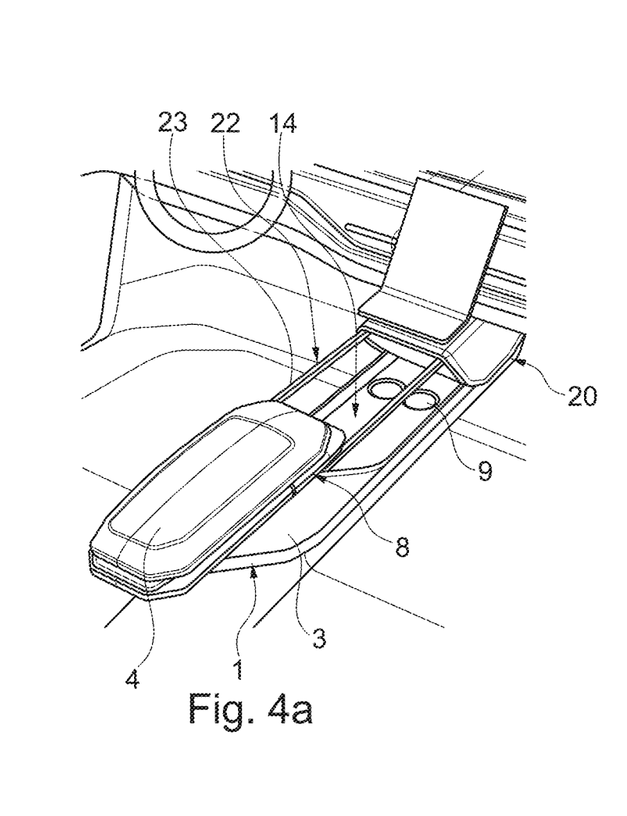
FIG. 4a is a schematic and perspective illustration of a further exemplary embodiment of a center console in a first state.
Figure 4B:
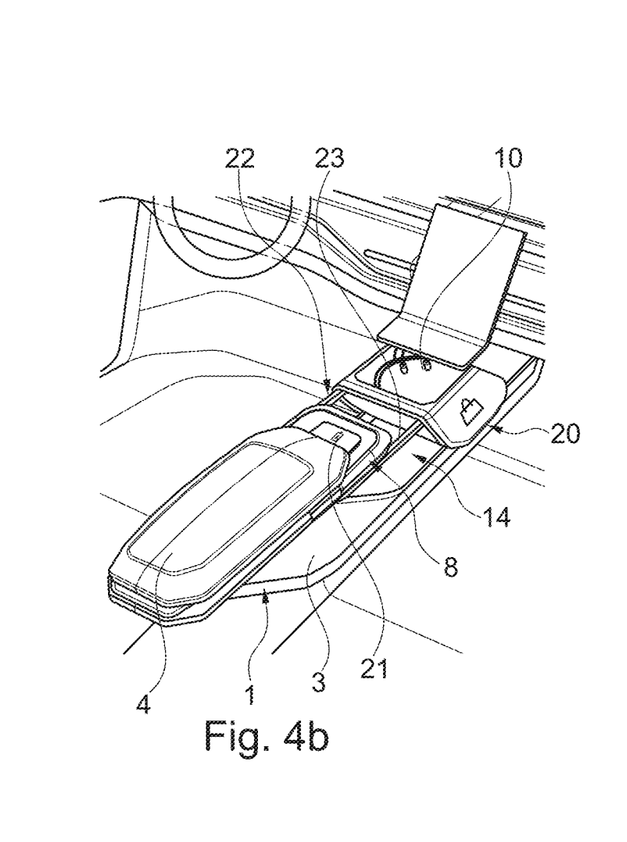
FIG. 4b is a schematic and perspective illustration of a further exemplary embodiment of a center console in a second state.

FIGS. 4a-4b are schematic and perspective illustrations of a further exemplary embodiment of a center console 1 in different states. The center console 1 has the main body 3 and has the armrest 4 in a rearward position on the main body 3. The main body 3 has the continuous, upwardly open storage chamber 14 that extends as far as under the armrest 4.

The center console 1 furthermore has the functional unit 8. The functional unit 8 is mounted linearly movably between a rearward rest position shown in FIG. 4a, in which the functional unit 8 is predominantly concealed under the armrest 4 and thus fully opens up an entrance to the storage chamber 14, and a forward functional position shown in FIG. 4b, in which the functional unit 8 is predominantly forwardly offset in relation to the armrest 4. The functional unit 8 has an induction charging unit 21 according to one example shown in FIG. 4b.

The center console 1 furthermore has a rail guide 22 which is arranged forward of the armrest 4 and by use of which the further functional unit 20 is linearly movable mounted. The rail guide 22 has two guide rails 23 which are parallel to one another and horizontally spaced from one another and on which the further functional unit 20 is linearly movable mounted. The guide rails 23 each form an upper lateral edge of the storage chamber 14.

The center console 1 furthermore has a further functional unit 20 which is of portal-like form and which is mounted to be linearly movable between a forward rest position shown in FIG. 4a and at least one rearward functional position shown in FIG. 4b, wherein a spacing between the further functional unit 20 and the armrest 4 is smaller when the further functional unit 20 is in the functional position than when the further functional unit 20 is in the rest position. The further functional unit 20 has a stowage compartment 10.

FIG. 4a furthermore shows two beverage holders 9 on the base of the storage chamber 14. Since the further functional unit 20 is of portal-like form, it can be moved over and across beverages that are held by the beverage holders 9. Also illustrated in FIGS. 4a-4b is the display unit 17 as described with regard to FIGS. 2 and 3.

A center console is provided having the functional unit mounted linearly movably between a rearward rest position, in which the functional unit is arranged at least predominantly under the armrest, and at least one forward functional position, in which the functional unit is at least predominantly forwardly offset in relation to the armrest.

The features and measures individually specified in the description may be combined with one another in any technically meaningful way and reveal further refinements of the disclosure. The description additionally characterizes and specifies the vehicle center console, in particular in conjunction with the figures.

According to the disclosure, the functional unit can be moved from its forward functional position into its rearward rest position, in which it opens up a space in the center console that can be used for accommodating other articles on or in the center console. Furthermore, in its rearward rest position, the functional unit may for example open up an entrance to a stowage compartment of the center console, which entrance may be partially blocked by the functional unit when the functional unit is situated in the forward functional position. It is thus also possible, for example, to realize a larger entrance to a storage space of the center console, such that even relatively large articles can be placed in the storage space. Consequently, an available structural space, or a storage space provided by the center console, can be optimally utilized by virtue of the functional unit being stowed when not in use, whereby the storage space of the center console is optimized.

A functional unit is to be understood to mean a part of the center console which has or offers a dedicated function that functionally enhances the center console. Here, the expressions "rearward" and "forward" relate to a vehicle in which the center console is installed, such that the center console has in particular a forward end and a rearward end. The center console may also have two or more identical or different functional units.

In the rearward rest position, the functional unit may be predominantly or entirely arranged under the armrest, and thus concealed. In the forward functional position, the functional unit may be predominantly or entirely forwardly offset in relation to the armrest, and thus accessible.

The rearwardly situated armrest may be one armrest that is shared by the users of the front seats of the vehicle. The armrest may be linearly movable and/or pivotable about a horizontal axis.

The center console may in particular be installed in a vehicle in the form of a motor vehicle, for example a passenger motor vehicle or utility motor vehicle. Such a vehicle therefore constitutes a further aspect according to the disclosure.

In one advantageous embodiment, the functional unit has at least one beverage holder and/or at least one induction charging unit and/or at least one stowage compartment. According to this embodiment, the functional unit may have one or more beverage holders or alternatively one or more induction charging units or alternatively one or more stowage compartments. Alternatively, the functional unit may have at least one beverage holder and at least one induction charging unit or alternatively at least one beverage holder and at least one stowage compartment or alternatively at least one induction charging unit and at least one stowage compartment. The induction charging unit allows wireless charging of a mobile radio terminal, for example.

In a further advantageous refinement, the center console has at least one storage trough which extends rearwardly so as to be situated partially under the armrest and within which the functional unit is linearly movably mounted. Various articles may be placed or set down in the storage trough. Since the storage trough extends rearwardly so as to be situated partially under the armrest, a space of the center console that is situated under the armrest can also be used to accommodate articles or parts thereof.

In a further advantageous embodiment, the center console has at least one roller shutter for closing an upper entrance opening of the storage trough. In this way, articles can be hidden in the storage trough in the vehicle, for example so as not to be visible from outside the vehicle in order to protect against theft. Furthermore, the roller shutter may be configured such that, when in its closed state in which it completely closes the upper entrance opening of the storage trough, the roller shutter forms a shelf in the center console on which articles can be placed.

In a further advantageous embodiment, the center console has at least one storage chamber arranged under the armrest, wherein the armrest is pivotable about a horizontal axis. Since the armrest is pivotable, it can be pivoted from a horizontal functional position into a vertical opening position in order to open up the entrance to the storage chamber arranged under the armrest. The presence of the storage chamber increases the storage capacity of the center console. Here, the functional unit may be linearly movably mounted on a portion of the center console that is situated under the armrest, such that, to make the storage chamber fully accessible, it may be necessary for the functional unit to be displaced into its forward functional position.

In a further advantageous embodiment, the center console has at least one display unit which is forwardly spaced from the armrest. The display-holding unit can be used to hold a display by use of which, for example, various vehicle functions can be accessed and/or set. A corresponding display in the form of a touchscreen can thus be arranged on the center console rather than in the commonly used conventional location on a dashboard. The spacing between the display-holding unit and the armrest is selected such that the functional unit, when in its forward functional position, is arranged with a spacing to the display-holding unit.

In a further advantageous embodiment, on the display-holding unit, there is formed at least one display holder and at least one upwardly open stowage compartment which is arranged forward of the display holder. A display may be fastened directly to the display holder. The stowage compartment of the display-holding unit is then arranged in a concealed manner behind the display arranged on the display holder.

In a further advantageous embodiment, on the display-holding unit, at least one further functional unit is mounted to be linearly movable between a forward rest position, in which the further functional unit is at least predominantly concealed on the display-holding unit, and at least one rearward functional position, in which the further functional unit is at least predominantly rearwardly offset in relation to the display-holding unit. The further functional unit can be moved from its rearward functional position into its forward rest position, in which it opens up a space that can be used for accommodating other articles on or in the center console. Furthermore, in its forward rest position, the further functional unit may for example open up an entrance to a stowage compartment of the center console, which entrance may be at least partially blocked by the further functional unit when the further functional unit is situated in the rearward functional position. It is thus also possible, for example, to realize a larger entrance to a storage space of the center console, such that even relatively large articles can be placed in the storage space. Consequently, an available structural space, or a storage space provided by the center console, can be optimally utilized by virtue of the further functional unit being stowed when not in use, whereby the storage space of the center console is optimized. In the forward rest position, the further functional unit may be predominantly or entirely arranged under and/or within the display-holding unit, and thus concealed. In the rearward functional position, the further functional unit may be predominantly or entirely forwardly offset in relation to the display-holding unit. The further functional unit may have at least one beverage holder and/or at least one induction charging unit and/or at least one stowage compartment. The further functional unit may thus have one or more beverage holders or alternatively one or more induction charging units or alternatively one or more stowage compartments. Alternatively, the further functional unit may have at least one beverage holder and at least one induction charging unit or alternatively at least one beverage holder and at least one stowage compartment or alternatively at least one induction charging unit and at least one stowage compartment.

In a further advantageous embodiment, the center console has at least one further functional unit which is of portal-like form, and which is mounted to be linearly movable between a forward rest position and at least one rearward functional position, wherein a spacing between the further functional unit and the armrest is smaller when the further functional unit is in the functional position than when the further functional unit is in the rest position. Owing to the portal-like form of the further functional unit, a storage space that is present in the center console is not constricted by the presence of the further functional unit but is bridged by the further functional unit. The further functional unit can be moved from its rearward functional position into its forward rest position, in which it opens up a space that can be used for accommodating other articles on or in the center console. Furthermore, in its forward rest position, the further functional unit may for example open up an entrance to a stowage compartment of the center console, which entrance may be at least partially blocked by the further functional unit when the further functional unit is situated in the rearward functional position. It is thus also possible, for example, to realize a larger entrance to a storage space of the center console, such that even relatively large articles can be placed in the storage space. Consequently, an available structural space, or a storage space provided by the center console, can be optimally utilized by virtue of the further functional unit being stowed when not in use, whereby the storage space of the center console is optimized. In the forward rest position, the further functional unit may be predominantly or entirely arranged under a display unit of the vehicle, and thus concealed. In the rearward functional position, the further functional unit may be predominantly or entirely rearwardly offset in relation to the display unit of the vehicle. The further functional unit may have at least one beverage holder and/or at least one induction charging unit and/or at least one stowage compartment. The further functional unit may thus have one or more beverage holders or alternatively one or more induction charging units or alternatively one or more stowage compartments. Alternatively, the further functional unit may have at least one beverage holder and at least one induction charging unit or alternatively at least one beverage holder and at least one stowage compartment or alternatively at least one induction charging unit and at least one stowage compartment.

In a further advantageous embodiment, the center console has at least one rail guide which is arranged forward of the armrest and by use of which the further functional unit is to be linearly movable. The rail guide may for example have two guide rails which are parallel to one another and horizontally spaced from one another and on which the further functional unit is linearly movably mounted. The guide rails may each form a lateral upper edge of a storage space of the center console.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A center console for a vehicle, the center console comprising:
   a rearwardly situated armrest;
   a functional unit mounted to be linearly movable between a rearward rest position, in which the functional unit is arranged at least predominantly under the armrest, and at least one forward functional position, in which the functional unit is at least predominantly forwardly offset in relation to the armrest;
   a display-holding unit which is forwardly spaced from the armrest; and
   a further functional unit mounted to be linearly movable between a forward rest position, in which the further functional unit is at least predominantly concealed on the display-holding unit, and a rearward functional position, in which the further functional unit is at least predominantly rearwardly offset in relation to the display-holding unit.

2. The center console according to claim 1, wherein the functional unit has at least one of a beverage holder, an induction charging unit and a stowage compartment.

3. The center console according to claim 1, further comprising a storage trough which extends rearwardly so as to be situated partially under the armrest and within which the functional unit is linearly movable mounted.

4. The center console according to claim 3, further comprising a roller shutter for closing an upper entrance opening of the storage trough.

5. The center console according to claim 1, further comprising a storage chamber arranged under the armrest, wherein the armrest is pivotable about a horizontal axis.

6. The center console according to claim 1, wherein on the display-holding unit, there are formed at least one display holder and at least one upwardly open stowage compartment which is arranged forward of the display holder.

7. The center console according to claim 1, wherein the further functional unit is of a portal-like form and is mounted to be linearly movable between a forward rest position and a rearward functional position, and wherein a spacing between the further functional unit and the armrest is smaller when the further functional unit is in the functional position than when the further functional unit is in the rest position.

8. The center console according to claim 7, further comprising at least one rail guide arranged forward of the armrest and by use of which the further functional unit is linearly movable mounted.

9. A console for a vehicle, the console comprising:
   a rearwardly situated armrest;
   a functional unit mounted to be linearly movable between a rearward rest position, in which the functional unit is arranged at least predominantly under the armrest, and at least one forward functional position, in which the functional unit is at least predominantly forwardly offset in relation to the armrest, wherein the functional unit has at least one of a beverage holder, an induction charging unit, and a stowage compartment;
   a display-holding unit which is forwardly spaced from the armrest; and
   a further functional unit mounted to be linearly movable between a forward rest position, in which the further functional unit is at least predominantly concealed on the display-holding unit, and a rearward functional position, in which the further functional unit is at least predominantly rearwardly offset in relation to the display-holding unit.

10. The console according to claim 9, further comprising a storage trough which extends rearwardly so as to be situated partially under the armrest and within which the functional unit is linearly movable mounted.

11. The console according to claim 10, further comprising a roller shutter for closing an upper entrance opening of the storage trough.

12. The console according to claim 9, further comprising a storage chamber arranged under the armrest, wherein the armrest is pivotable about a horizontal axis.

13. The console according to 9, wherein, on the display-holding unit, there are formed at least one display holder and at least one upwardly open stowage compartment which is arranged forward of the display holder.

14. The console according to claim 9, wherein the further functional unit is of a portal-like form and is mounted to be linearly moveable between a forward rest position and a rearward functional position, wherein a spacing between the further functional unit and the armrest is smaller when the further functional unit is in the functional position than when the further functional unit is in the rest position.

15. The console according to claim 14, further comprising at least one rail guide arranged forward of the armrest and by use of which the further functional unit is linearly movable mounted.

16. The console according to claim 9, wherein the console is a center console.

* * * * *